May 1, 1928.

J. A. KIRBY 1,668,277

CABLE LAYING APPARATUS

Filed March 11, 1927

Inventor
J. A. Kirby
by
Atty

May 1, 1928.

J. A. KIRBY 1,668,277

CABLE LAYING APPARATUS

Filed March 11, 1927

Inventor
J. A. Kirby
by
Atty

May 1, 1928.  J. A. KIRBY  1,668,277

CABLE LAYING APPARATUS

Filed March 11, 1927   3 Sheets-Sheet 3

Inventor
J. A. Kirby
By Jno Lurere
Atty

Patented May 1, 1928.

1,668,277

UNITED STATES PATENT OFFICE.

JOSEPH ANNING KIRBY, OF DUNEDIN, NEW ZEALAND.

CABLE-LAYING APPARATUS.

Application filed March 11, 1927. Serial No. 174,646.

This invention relates to underground metal covered telephone and the like cable and particularly to apparatus and methods of laying such duct or cable, and has for its object the provision of improvements in implements of the aforesaid type.

According to the invention a frame or chassis provided with running wheels so as to be capable of being drawn along the surface of the ground by means of a tractor or the like, is provided with a plate or shear adapted to be lowered into contact with the ground to form a narrow fissure or breach to a desired depth in the latter.

Means are provided on the frame or chassis for supporting a drum or reel, the cable or duct from the latter being passed through the rear of the plate or shear and thence into the fissure or breach in the ground, automatically as the implement progresses over the ground and forms said fissure or breach.

The invention will be more particularly described with reference to the accompanying drawings, wherein:—

Figure 2 is a plan view thereof, while

Figure 1:
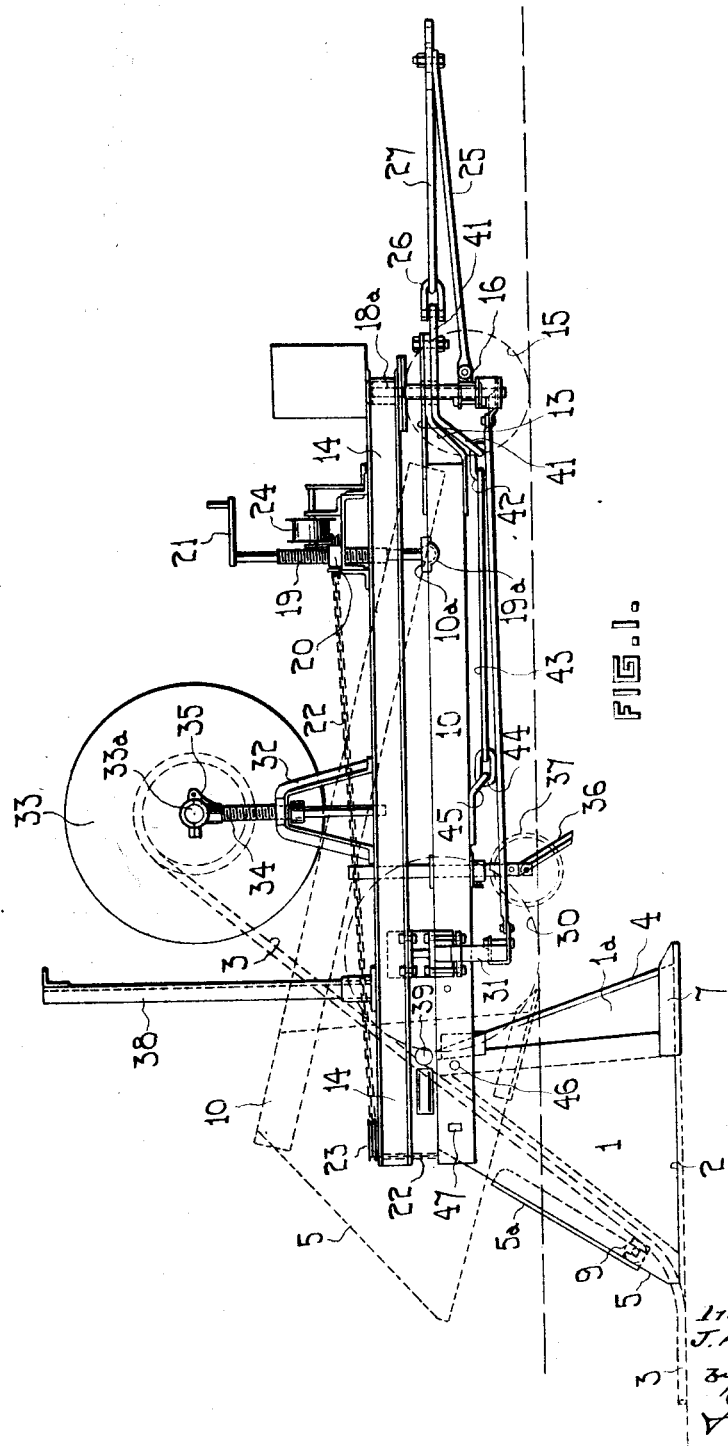
Figure 1 is a side elevation of the machine.
Figure 2:
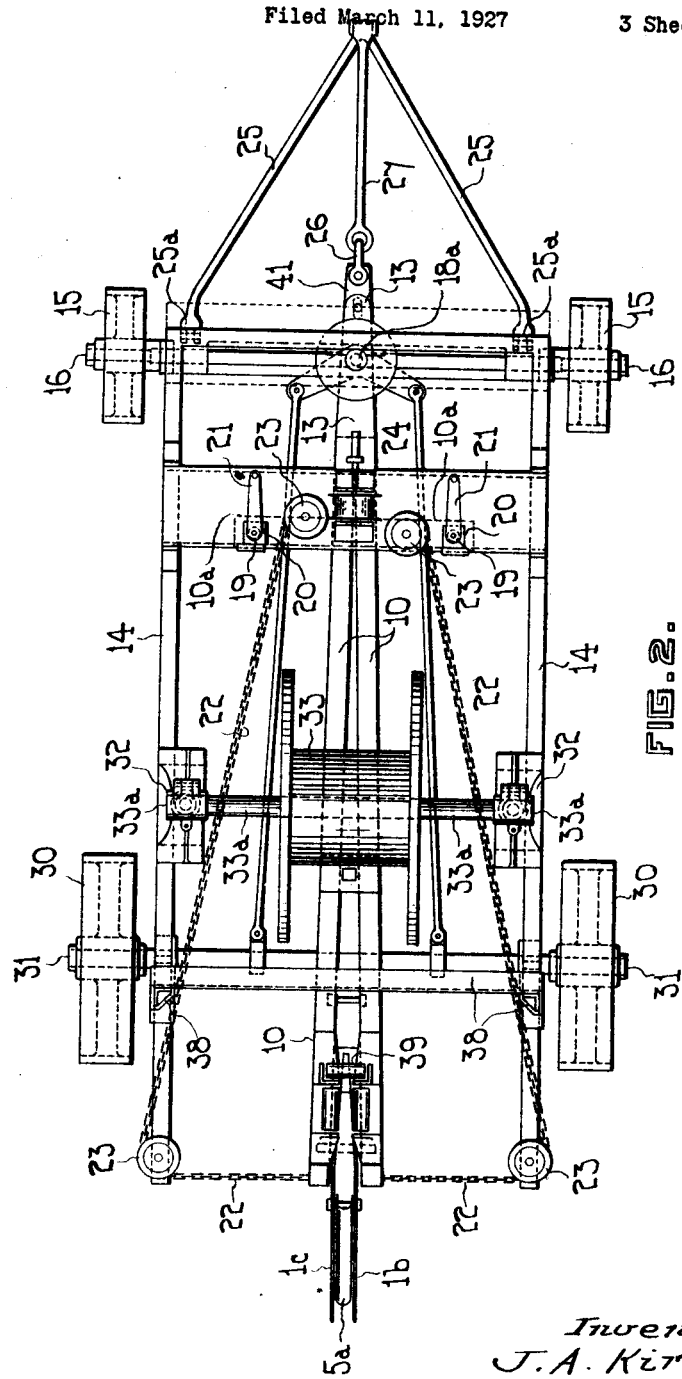
Figure 3:
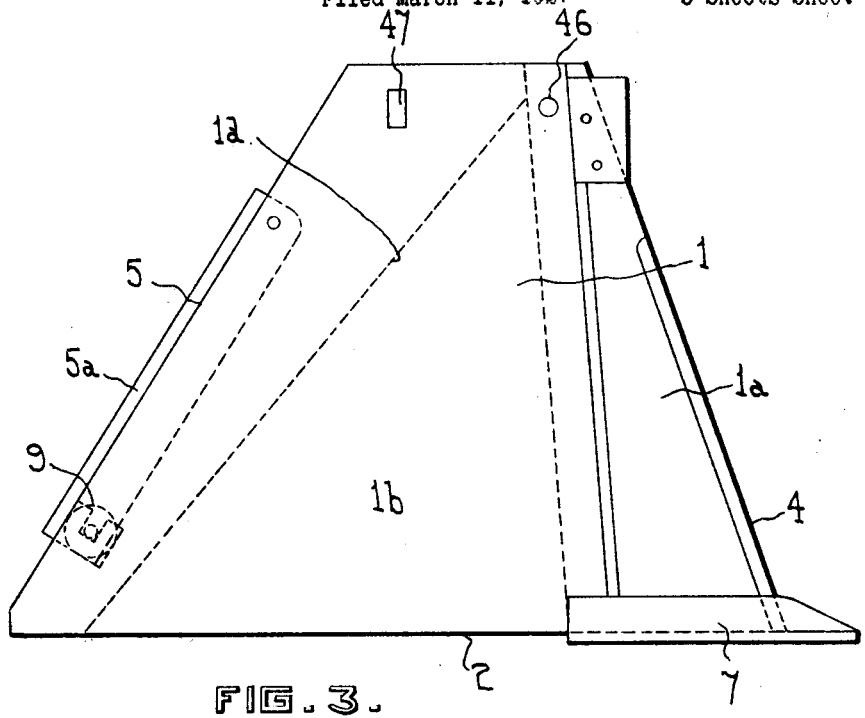
Figure 3 is a detail view of the plate.
Figure 4:
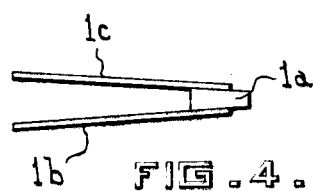
Figure 4 is a detail view in plan of the top of said plate.
Figure 5:
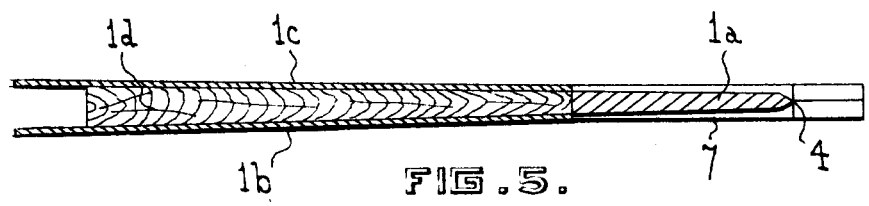
Figure 5 is a sectional plan view of said plate.

A plate or shear 1 adapted to cut or form a narrow fissure or breach in the ground comprises preferably a forged plate 1$^a$ and a pair of side plates 1$^b$ and 1$^c$, there being provided between the latter a partial filling of hardwood 1$^d$.

The plate or shoe 1 has a base 2 adapted to form the bed of the fissure in which the metal duct or cable 3 is to be laid, and an entering edge 4 which projects forwardly and enters the ground to cut and gradually expand the fissure to form a channel to receive the duct or cable 3.

In a modified form of plate 1 the same can be formed by two members separately constructed and hinged together in an approximately vertical direction, to give a certain amount of flexibility to the plate 1 and so facilitate laying operations on bends and sharp turns.

The base 2 of the plate 1 is preferably provided with a removable shoe 7 suitably constructed to form a channel for the metal duct or cable 3, while the entering edge 4 is necessarily sharpened, the plates 1$^b$ and 1$^c$ being spread towards the trailing edge 5, the hardwood filling being located between said plates but not extending altogether to the edge 5 so as to leave a space between said plates along said edge through which the metal duct or cable 3 is fed during laying operations.

A U-shaped or curved plate 5$^d$ is adapted to be fitted between the rear edges of the plates 1$^b$ and 1$^c$ so as to close the edge 5 and retain the cable or duct 3 in the space between said plates, a small roller 9 being disposed within said plate 5$^d$ at a point near its lower extremity in order to reduce frictional resistance of the duct or cable 3 in the passage to a minimum.

The plate or shear 1 is suitably attached to the rear end of a beam 10 the forward end of which is pivotally connected to the fore carriage of a wheeled frame or chassis 14.

The chassis or frame 14 is preferably constructed of channel or angle iron suitably braced with wooden beams and flooring. Mounted at the forward end of this frame or chassis 14 are a pair of suitably dimensioned road wheels 15 carried on an axle 16 adapted to pivot freely on the said chassis or frame 14 as at 18$^d$ to provide for steering.

The attachment of the forward end of the floating beam 10 to the fore part of the chassis 14 is preferably effected by means of straps 13 containing slots 13$^d$ passed on the bolt or pin 18$^d$ which forms the pivot of the front axle 16.

Threaded screws 19 adapted to work vertically through threaded bosses 20 on a cross member of the frame or chassis 14 are secured at their lower ends by means of universal joints 19$^d$ to a cross member 10$^d$ secured to the floating beam 10 near the latter's forward end. The upper ends of the screws are provided with suitable handles, cranks and the like 21 whereby they can be rotated to cause the forward end of the beam 10 to be raised or lowered as desired to control the bite or cut of the plate or shear 1.

Means for controlling the depth of the fissure or breach to be made by the plate or shear 1, consists of chains 22 attached to the rear end of the beam 10 and passed around pulley 23 on the rear of the chassis 14 to a winch or winches 24, so that by taking up or paying out the chains 22 on the latter, the depth of cut can be regulated as desired.

Suitable means for coupling the device to a tractor can comprise a V-shaped bar member 25 secured at its free ends to the axle 16 at 25$^d$. A shackle 26 pivotally connected to the forward end of the strap 13 connecting the beam 10 to the bolt 18$^d$, is also pivotally connected to the rear end of a bar 27 the forward end of which is connected to the apex of the V-shaped bar member 25 by means of a pin on the latter passed through and slidable in a slot in the forward end of said bar 27.

The rear road wheels 30 are preferably of larger diameter than the front wheels 15, and are mounted on an axle 31 suitably secured to the chassis 14 at a point near the rear end thereof.

Brackets or the like 32 mounted on the chassis 14, one at either side thereof, have vertically disposed screws 34 adapted to work through the upper ends, the tops of said screws 34 carrying brackets 35 adapted to support the spindle 33$^d$ of the cable drum or reel 33.

In order to prevent chafing of the duct or cable 3 as it is fed into the upper end of the plate sheathing at the trailing edge 5 of the plate or shear 1, said duct or cable 3 is preferably passed through suitable guide blocks or over a roller 39 mounted above the said plate or shear 1, and pivotally at an angle to one another on either the said plate 1 or the chassis 14 to serve as guides for the duct or cable 3 as it is unwound from the drum or reel 33 and fed through the plate or shear 1 into the trench or channel prepared for its reception by the apparatus.

A suitable angle iron frame 38 can be provided on the chassis 14 to the rear of the drum or reel 33 and is provided to support or carry a block or pulley and tackle for use in hoisting a fresh reel or drum 33 into position or in lowering an exhausted one to the ground.

A coulter wheel 37 or a tine knife 36 can be secured to the floating beam 10 in any suitable manner so as to cut or incise the surface of the ground immediately in front of the plate or shear 1 to facilitate entry of the latter into the ground and its subsequent operation in the latter.

In operation the plate or shear 1 is sunk into the ground at a depth which it is desired to lay the cable or duct 3, the latter having first been passed through the passage down the edge 5 of said plate or shear 1 and its free end suitable anchored.

The appliance being drawn forwardly, the cable 3 unwinds from the reel 33 and is automatically fed through the passage in the plate or shear 1 and deposited in the bottom of the channel formed by the latter.

In order to provide a steady and even pull on the floating beam 10, the latter can also be connected to the draught means by a strap 41 secured to the straps 13 on the forward end of the beam 10, by means of a bolt passed through said straps 13 and through a slot in the end of the strap 41 the forward end of the latter being connected to the shackle 26 hereinbefore described.

The rear end of the strap 41 is inclined or bent to beneath the forward end of the beam 10 and is connected by a link 42 to a bar 43 which is in turn connected by a further link 44 to an eye 45 secured to the underside of the beam 10 about midway of its length. The effect of this connection is to counteract to a great extent any tendency of the plate or shear 1 to rise or tend to withdraw itself from the cut.

The plate 1 is preferably secured to the beam 10 by means of a pivot 46 near the front edge of the said plate and by a cotter pin 47 passed through registering holes in the said plate and beam near the rear edge of the former. By this means, the plate 1 is firmly attached to the beam.

Should it be desired to throw the plate 1 out of action, the cotter pin 47 is knocked out, whereupon should any strain be placed on the cutting edge 4 the said plate 1 will pivot on the point 46 and trail behind the beam 10 in an inoperative position.

What I claim as new and desire to secure by Letters Patent is:—

1. A device of the kind specified comprising a plate having a base entering edge and trailing edge: a beam supporting the said plate: draught means associated with said beam: a chassis on wheels supporting said beam and plate: brackets on the chassis for supporting a cable carrying reel: means for guiding said cable through the plate carried by the beam: and means for raising, lowering, and inclining said beam so as to regulate the depth of entry of the aforesaid metal plate into the ground comprising supporting brackets mounted on a cross member of the chassis, screws operable vertically through said brackets, and universal jointed connections between the lower ends of said screws and the ends of a cross member secured to the beam near its forward end.

2. A device of the kind specified according to claim 1 wherein chains secured to the rear end of the beam carrying the metal plate are passed around pulleys to a suitable winch by means of which the rear end of the beam can be adjusted in the chassis.

In testimony whereof I affix my signature.

JOSEPH ANNING KIRBY.